(12) United States Patent
Bernier et al.

(10) Patent No.: US 9,994,308 B2
(45) Date of Patent: Jun. 12, 2018

(54) HELICOPTER SKID LANDING GEAR

(71) Applicants: BELL HELICOPTER TEXTRON INC., Fort Worth, TX (US); UNIVERSITE LAVAL, Quebec (CA)

(72) Inventors: Simon Bernier, St Jerome (CA); Robert Clive Fews, Beaconsfield (CA); Michel Guillot, Quebec (CA); Augustin Gakwaya, Quebec (CA); Jocelyn Blanchet, Quebec (CA); Xavier Jean-Gilles Elie-Dit-Cosaque, Quebec (CA); Julie Levesque, Stoneham-et-Tewkesbury (CA); Giuseppe Aquino, Laval (CA)

(73) Assignees: Bell Helicopter Textron Inc., Fort Worth, TX (US); Université Laval, Quebec (CA)

( * ) Notice: Subject to any disclaimer, the term of this patent is extended or adjusted under 35 U.S.C. 154(b) by 760 days.

(21) Appl. No.: 14/133,698

(22) Filed: Dec. 19, 2013

(65) Prior Publication Data

US 2014/0224928 A1 Aug. 14, 2014

Related U.S. Application Data

(60) Provisional application No. 61/740,923, filed on Dec. 21, 2012.

(51) Int. Cl.
*B64C 25/52* (2006.01)
*B21D 26/033* (2011.01)
(Continued)

(52) U.S. Cl.
CPC ............ *B64C 25/52* (2013.01); *B21D 26/033* (2013.01); *B21D 53/92* (2013.01); *B64C 2025/325* (2013.01); *Y10T 428/12292* (2015.01)

(58) Field of Classification Search
CPC .... B64C 25/52; B64C 2025/325; B64C 25/66
(Continued)

(56) References Cited

U.S. PATENT DOCUMENTS 3,144,223 A * 8/1964 Nichols ................... B64C 25/52
244/100 R
4,659,069 A * 4/1987 Odobasic ................ B64C 25/64
244/104 R
(Continued)

FOREIGN PATENT DOCUMENTS

| CN | 101973393 A | 7/2007 |
|---|---|---|
| CN | 1990347 A | 2/2011 |
| WO | 2007018499 A1 | 2/2007 |

OTHER PUBLICATIONS

Deschamps, F. Livet and Y. Brechet, Influence of Predeformation on Ageing in an Al-Zn—Mg Alloy—I. Microstructure Evolution and Mechanical Properties, Pergamon, vol. 47, No. 1, pp. 281-292, 1999.
(Continued)

*Primary Examiner* — Tien Q Dinh
*Assistant Examiner* — Steven Hawk
(74) *Attorney, Agent, or Firm* — James E. Walton

(57) ABSTRACT

A cross tube for a helicopter skid landing gear, including a monolithic metallic tube having a central portion extending transversely between two end portions with longitudinal central axes of the central portion and of the end portions being located in a plane, where the central portion has inner and outer heights, the end portions each have inner and outer heights, and the inner and outer heights of one of the central portion and the end portion are respectively greater than the inner and outer heights of the other of the central portion and the end portion. A skid tube with two portions with cross-sections having one or both of different orientations with respect to one another and different dimensions with respect
(Continued)

to one another, and a method of forming a structural tube for a helicopter skid landing gear are also provided.

19 Claims, 9 Drawing Sheets

(51) Int. Cl.
  *B21D 53/92* (2006.01)
  *B64C 25/32* (2006.01)
(58) Field of Classification Search
  USPC ............................................................ 244/108
  See application file for complete search history.

(56) References Cited

U.S. PATENT DOCUMENTS

| | | | | |
|---|---|---|---|---|
| 5,462,242 A * | 10/1995 | Collins | ................... | B64C 25/52 244/108 |
| 6,122,948 A * | 9/2000 | Moses | ................... | B21D 26/033 29/897.2 |
| 6,244,538 B1 * | 6/2001 | Howard | ................... | B64C 25/52 244/104 R |
| 6,513,243 B1 * | 2/2003 | Bignucolo | ............ | B21D 26/033 29/421.1 |
| 8,721,282 B2 * | 5/2014 | Thomas | ................... | B64C 11/20 416/23 |
| 8,919,694 B2 * | 12/2014 | Amante | ................... | B64C 25/52 244/108 |
| 8,998,134 B2 * | 4/2015 | Fews | ....................... | B64C 25/52 244/108 |
| 2003/0037424 A1 * | 2/2003 | Platner | ................... | B23P 15/00 29/421.1 |
| 2003/0037426 A1 * | 2/2003 | Platner | ................... | B23P 15/00 29/428 |
| 2003/0102045 A1 * | 6/2003 | Takahashi | ............ | B21D 26/033 138/143 |
| 2004/0155520 A1 * | 8/2004 | Varela | ................... | B21D 26/033 301/124.1 |
| 2004/0200255 A1 * | 10/2004 | Newport | ................... | B21C 1/24 72/370.14 |
| 2007/0283562 A1 * | 12/2007 | Weise | ................... | B21D 26/033 29/897.2 |
| 2010/0308156 A1 * | 12/2010 | Landry | ................... | B64C 25/52 244/17.17 |
| 2011/0115183 A1 * | 5/2011 | Alesso | ................... | B60G 21/051 280/124.106 |
| 2011/0210201 A1 * | 9/2011 | Fews | ....................... | B64C 25/52 244/108 |
| 2013/0064666 A1 * | 3/2013 | Thomas | ................... | B64C 3/52 416/158 |
| 2013/0112810 A1 * | 5/2013 | Amante | ................... | B64C 25/52 244/108 |

OTHER PUBLICATIONS

American Helicopter Society International Inc., Efficient Helicopter Skid Landing Gear Dynamic Drop Simulation Using LS-DNYA, American Helicopter Society 59th Annual Forum, Phoenix, Arizona, May 6-8, 2003.
Yeong-Maw Hwang, Taylan Altan, Finite Element Analysis of Tube Hydroforming Processes in a Rectangular Die, Elsevier, Finite Elements in Analysis and Design 39 (2002) 1071-1082.
Jeong Kim, Li=Ping Lei, Beom-So Kang, Preform Design in Hydroforming of Automobile Lowe Arm by FEM, Elsevier, Journal of Materials Processing Technology 38 (20030 58-6.
EP Search Report dated Apr. 23, 2014 from counterpart EP App. No. 13197756.3.
Office Action dated Sep. 5, 2016 in related CN App. No. 201310717364.7, 18 pages.
Office Action dated May 12, 2017 in related CN App. No. 201310717364.7.
Chinese Office Action dated Aug. 24, 2017 in related CN App. No. 201310717364.7.

* cited by examiner

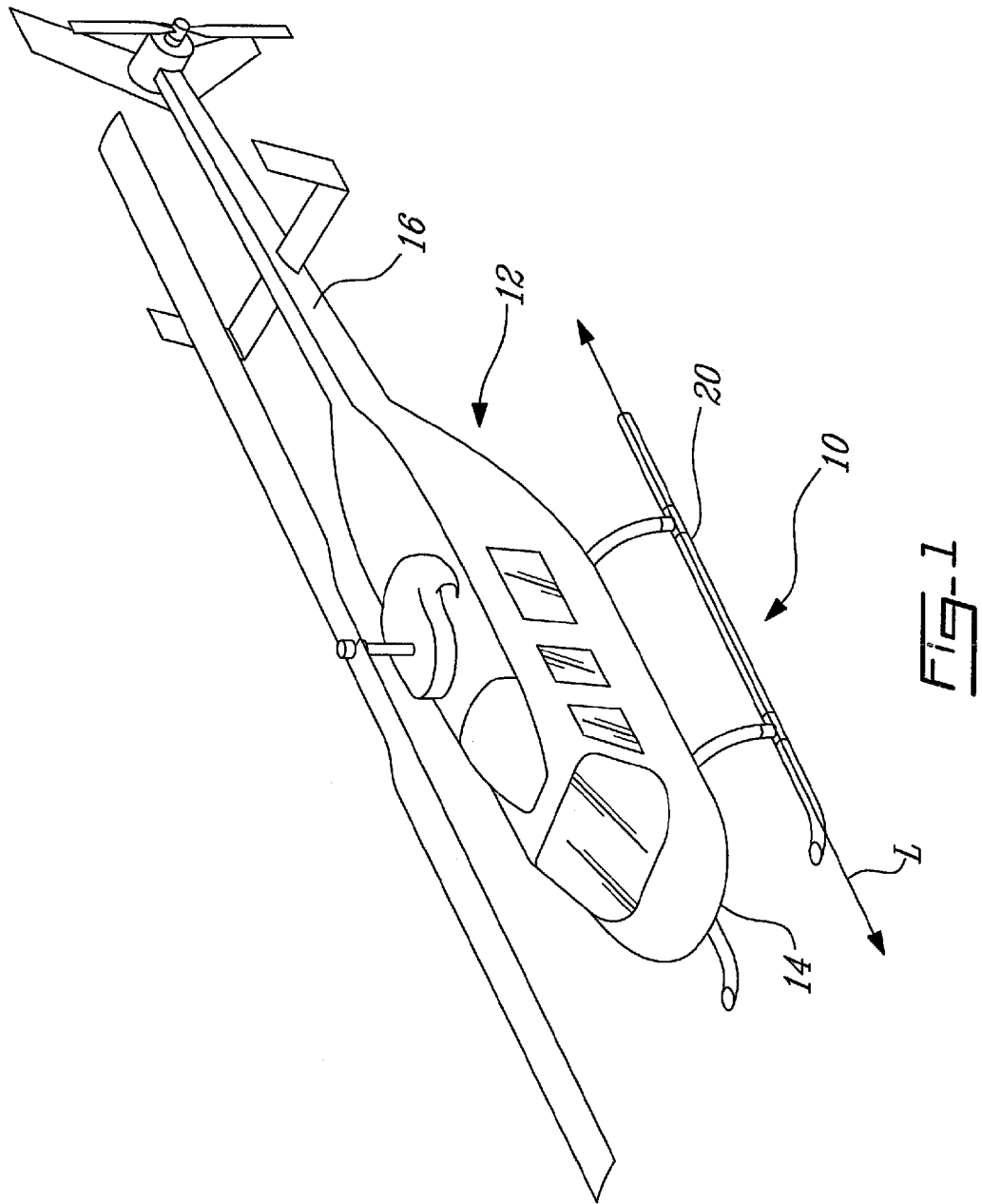

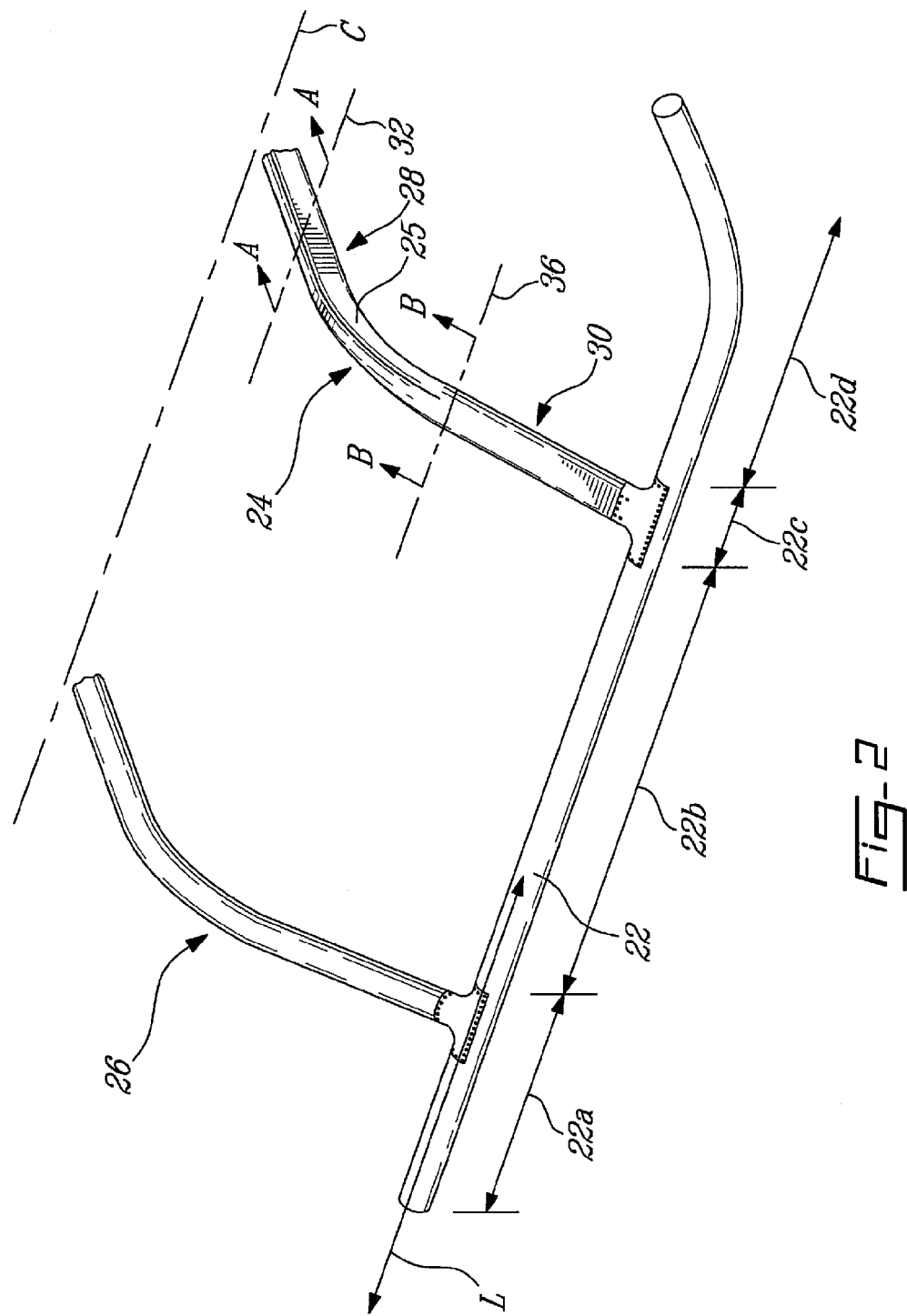

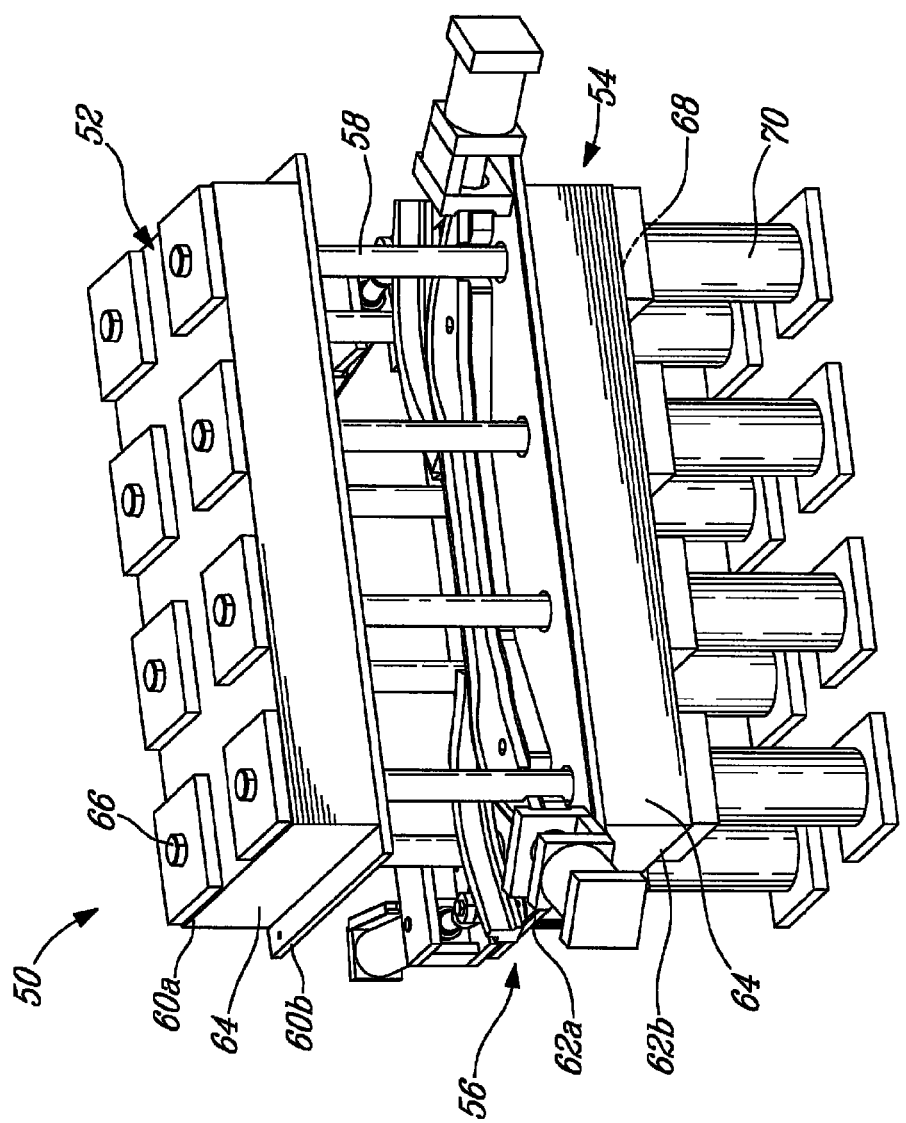

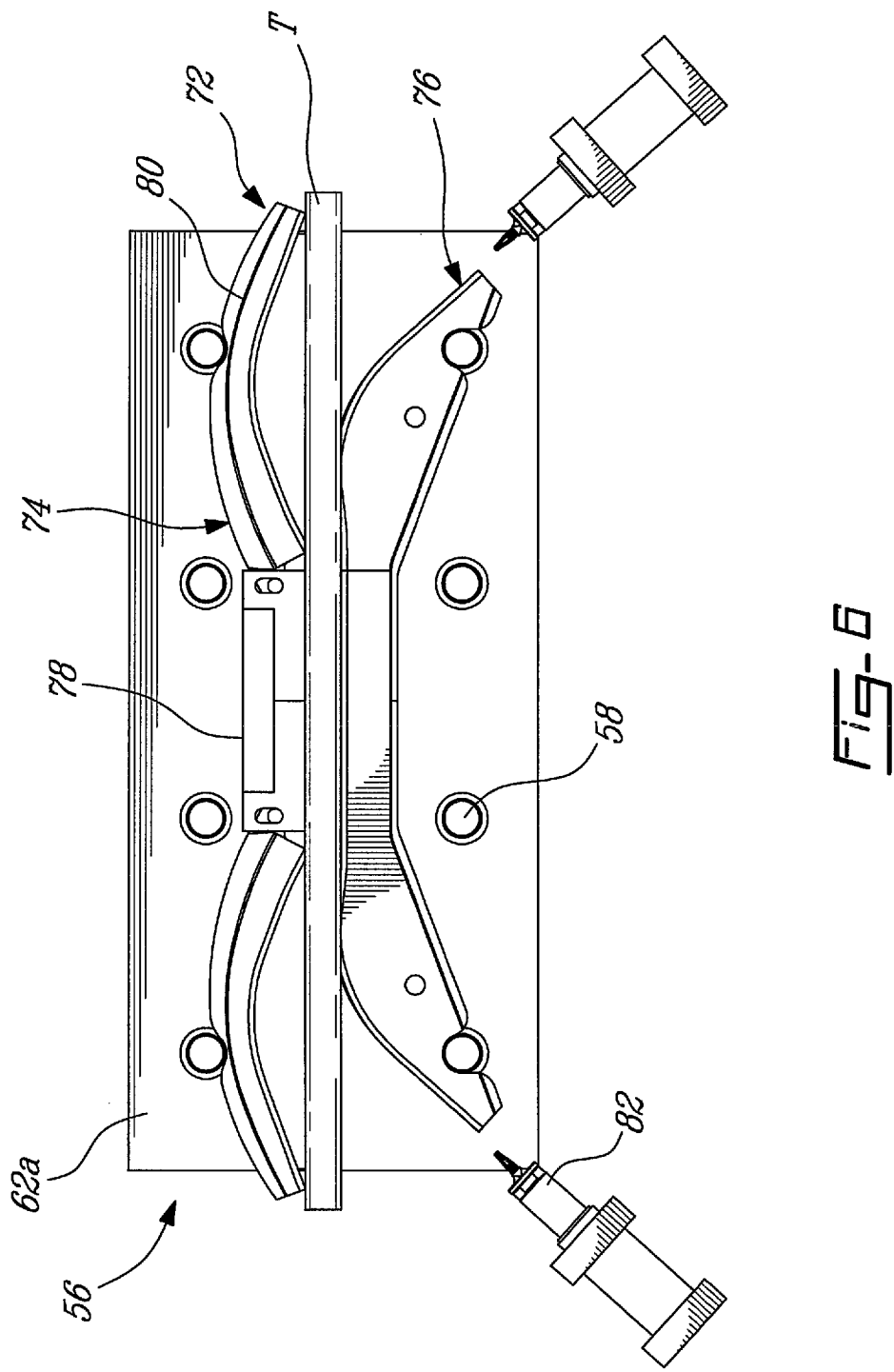

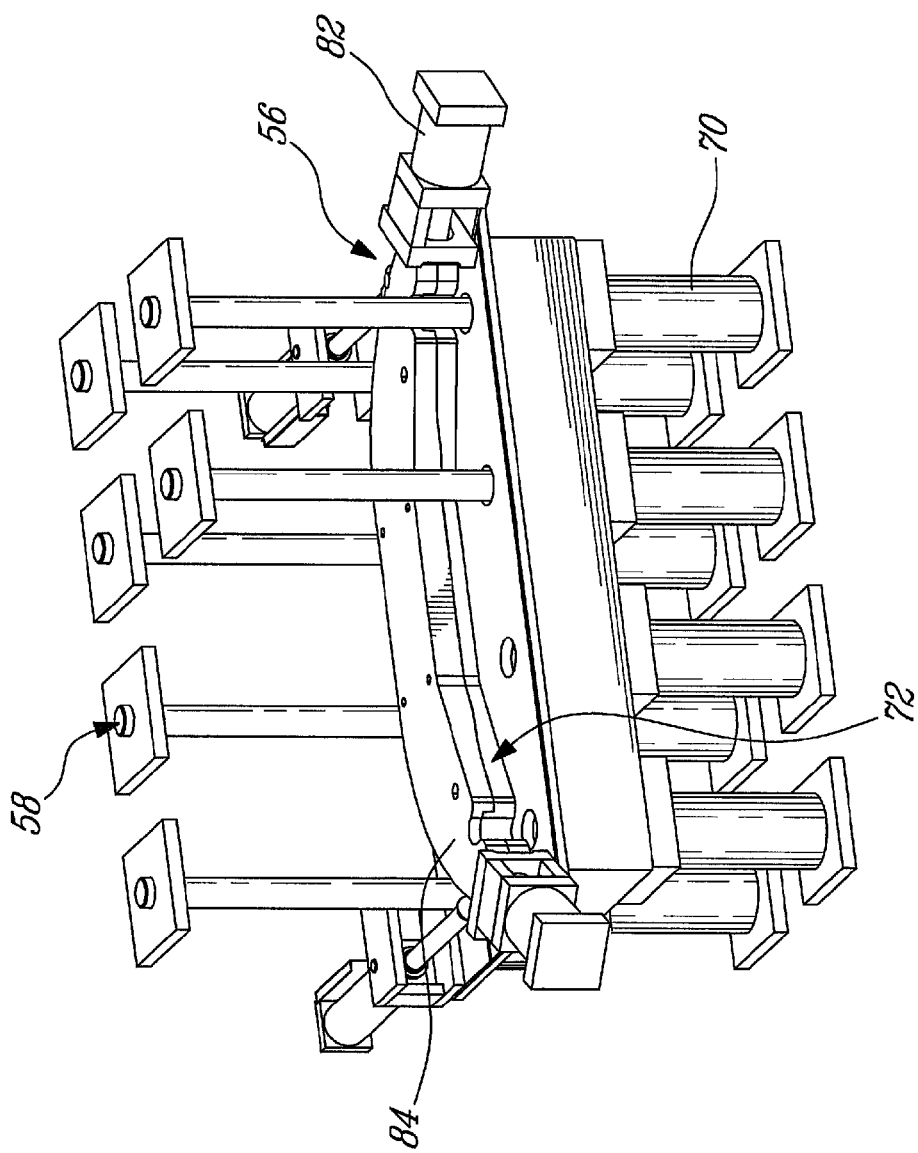

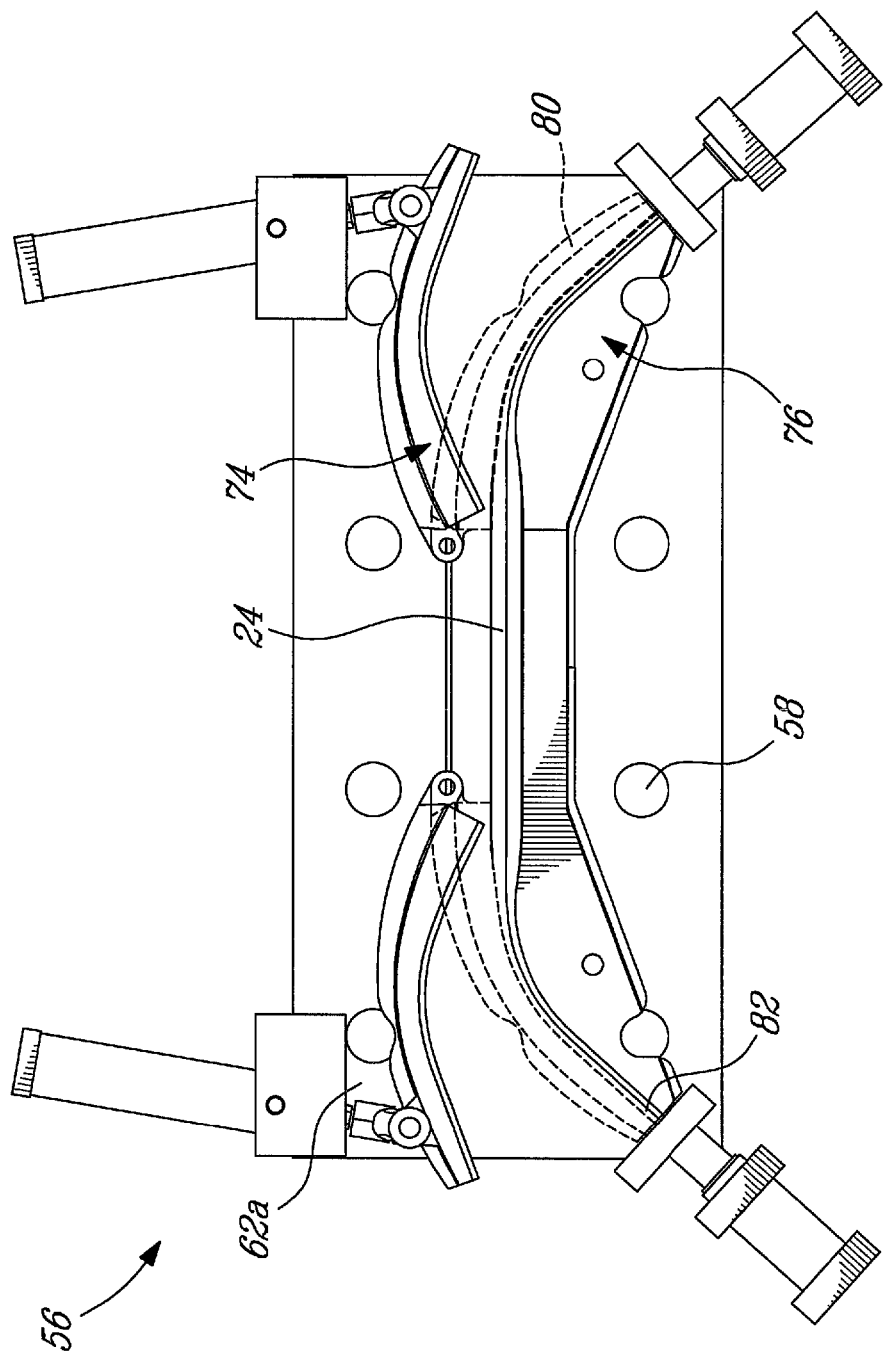

us 9,994,308 B2

HELICOPTER SKID LANDING GEAR

This application claims the benefit of U.S. Provisional Application No. 61/740,923 filed 21 Dec. 2012, titled "Helicopter Skid Landing Gear."

FIELD OF THE INVENTION

The present invention relates to helicopters landing gears, more particularly to skid type landing gears.

BACKGROUND ART

Helicopters, and particularly small and medium helicopters, may be equipped with a skid type landing gear. Skid landing gears generally include two longitudinal skid tubes for contacting the ground and two cross tubes connecting the skid tubes to the body of the helicopter, although alternate designs are also possible.

Skid landing gears are generally designed with consideration of energy absorption during hard landings, stress levels in normal landings which should be low enough to ensure a satisfactory fatigue life and an appropriate stiffness to avoid critical ground resonance modes.

Cross tubes typically have a circular or rectangular cross-section, to facilitate bending of the cross tubes to the desired shape. The cross tubes are generally made from an extruded tube having a constant cross-section; as such modulation of the inertias of the cross-section to minimize the cross tube weight can generally only be performed by changing the thickness of the tube, which typically provides for limited inertia variations. Thickness variations are typically obtained through chemically milling of the cross tubes after being formed to the desired profile, however, chemical milling processes are generally not environmentally friendly.

BRIEF DESCRIPTION OF THE DRAWINGS

Reference will now be made to the accompanying drawings, showing by way of illustration one of more particular embodiment(s) of the present invention and in which:

FIG. 1 is a schematic tridimensional view of a helicopter;

FIG. 2 is a schematic tridimensional view of part of a skid landing gear in accordance with a particular embodiment, which can be used on a helicopter such as that shown in FIG. 1;

FIG. 5 is a schematic tridimensional view of an apparatus for forming the cross tube of FIG. 2;

FIG. 6 is a top view of part of a mold assembly of the apparatus of FIG. 5, in an open position and receiving a straight tube therein;

FIG. 7 is a schematic view of the apparatus of FIG. 5, with a top member thereof omitted for improved clarity;

FIG. 8 is a top view of the part of the mold assembly of FIG. 6, in a closed position and containing a hydroformed tube.

DETAILED DESCRIPTION OF PARTICULAR EMBODIMENTS

Figure 3A:
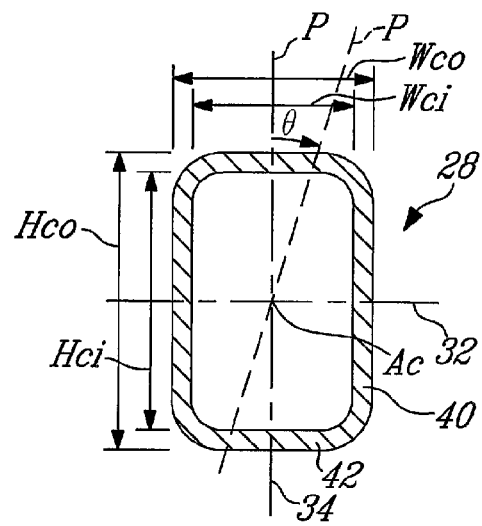
FIG. 3A is a cross-sectional view of a cross tube of the gear of FIG. 2 taken along line A-A thereof.

In accordance with a particular aspect, there is provided a cross tube for a helicopter skid landing gear, the tube comprising: a monolithic metallic tube having a central portion extending transversely between two end portions with longitudinal central axes of the central portion and of the end portions being located in a same plane, with at least part of the central portion having a cross-section defining first and second axes with the first axis, the second axis and the longitudinal axis of the central portion extending perpendicularly to each other and intersecting at a common point, one of the first and second axes extending along a minimum outer cross-sectional dimension of the central portion, the second axis extending at a smaller angle with respect to the plane than the first axis; and at least part of each end portion having a cross-section defining third and fourth axes with the third axis, the fourth axis and the longitudinal axis of the end portion extending perpendicularly to each other and intersecting at a common point, one of the third and fourth axes extending along a minimum outer cross-sectional dimension of the end portion, the fourth axis extending at a smaller angle with respect to the plane than the third axis; wherein the cross-section of the central portion has inner and outer heights defined along the second axis and the cross-section of the end portions each have inner and outer heights defined along the fourth axis, and the inner and outer heights of one of the central portion and the end portion are respectively greater than the inner and outer heights of the other of the central portion and the end portion.

In a particular embodiment, there is provided a skid landing gear for a helicopter, wherein one or both of the front and rear cross-tubes are as described above.

In accordance with another aspect, there is provided a skid tube for a helicopter skid landing gear, the tube comprising: a monolithic metallic tube having at least a first portion and a second portion extending from the first portion, the tube defining a ground contact plane for contact with a ground surface, with the first portion having a cross-section defining first and second axes with the first axis, the second axis and a longitudinal axis of the first portion extending perpendicularly to each other and intersecting at a common point, one of the first and second axes extending along a minimum outer cross-sectional dimension of the cross-section of the first portion, the first axis extending at a smaller angle with respect to the ground contact plane than the second axis; and the second portion having a cross-section defining third and fourth axes with the third axis, the fourth axis and a longitudinal axis of the second portion extending perpendicularly to each other and intersecting at a common point, one of the third and fourth axes extending along a minimum outer cross-sectional dimension of the cross-section of the second portion, the third axis extending at a smaller angle with respect to the ground contact plane than the fourth axis; the cross-sections of the first and second portions having one or both of different orientations with respect to one another and different dimensions with respect to one another, the different orientations including the first and third axes being non parallel, the different dimensions including outer and inner cross-sectional dimensions of the first portion defined along the second axis being respectively greater or respectively smaller than outer and inner cross-sectional dimensions of the second portion defined along the fourth axis.

This skid tube may be used in combination with a front and/or a rear cross-tube as described above.

In accordance with a further aspect, there is provided a method of forming a structural tube for a helicopter skid landing gear, the method comprising: providing a straight metallic tubular member; and hydroforming the tubular member to define a first cross-section for a first portion and a second cross-section for a second portion extending from the first portion, the first and second cross-sections having one or both of different orientations with respect to one another and different inner and outer dimensions with respect to one another.

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Referring now to FIG. 1, a helicopter 10 is generally shown. The helicopter 10 includes a fuselage 12 having a cabin portion 14 and a tail boom 16. The helicopter 10 is powered by one or more engines, a propulsion system such as a rotor system, and a flight control system. A landing gear assembly 20 is attached to a bottom portion of the fuselage 12.

Referring to FIG. 2, in a particular embodiment, the landing gear assembly 20 (only half of which is shown) is formed of structural tubes including two longitudinal skid tubes 22 (only one of which is shown) for contact with the ground, and front and rear cross tubes 24, 26 interconnecting the two skid tubes 22. A longitudinal direction can be defined along the ground contact portion of one of the skid tubes 22; when the helicopter rests on a horizontal ground surface, the longitudinal axis L is thus horizontal. The cross tubes 24, 26 are attached to the fuselage by fittings (not shown), which are external or internal to the fuselage. In a particular embodiment, the front cross tube 24 is attached to the fuselage 12 by two spaced apart fittings provided symmetrically about the central line C of the fuselage 12, while the rear cross tube 26 is attached to the fuselage 12 by a single central fitting allowing a pivoting motion of the fuselage 12 about the central line C. Alternate types of attachment are also possible, for example each cross tube 24, 26 being attached by two spaced apart fittings. The Figure depicts one half of each cross tube 24, 26 and it is understood that the other half is mirror image of the half shown such that each cross tube 24, 26 is symmetrical about the central line C of the fuselage 12.

The cross tubes 24, 26 and skid tubes 22 are made of metal. In a particular embodiment, the cross tubes 24, 26 and skid tubes 22 are made from high strength aluminum alloy, for example 7075-T73511 and 7075-T6511, respectively. Throughout this document any reference to an aluminum alloy by the designation "7075" refers to an aluminum alloy defined by the Aluminum Association's "7075" designation.

The front cross tube 24 includes at least a central portion 28 (only partially shown) extending transversely between two end portions 30 (only one of which is shown). In the embodiment shown, the central portion 28 is straight or substantially straight and a bend 25 is defined between the central portion 28 and each end portion 30, which also extend straight or substantially straight. Other configurations are also possible, including but not limited to a configuration where the central portion is curved and connects directly to the end portions, a configuration where the central portion has a wave shape, a configuration where intermediary portions are provided between the central portion and the end portions, etc.

The front cross tube 24 is monolithic, i.e. made from a single continuous tube formed to obtain the desired profile and cross-sections, as will be further detailed below. The shape of the cross-section of the front cross tube 24 is optimized along its length. The central portion 28 and end portions 30 have different cross-sectional shapes and dimensions from one another. The central portion 28 and end portions 30 have longitudinal central axes $A_C$, $A_E$ which are located in and together define a same plane P (FIGS. 3A-C).

Figure 3B:
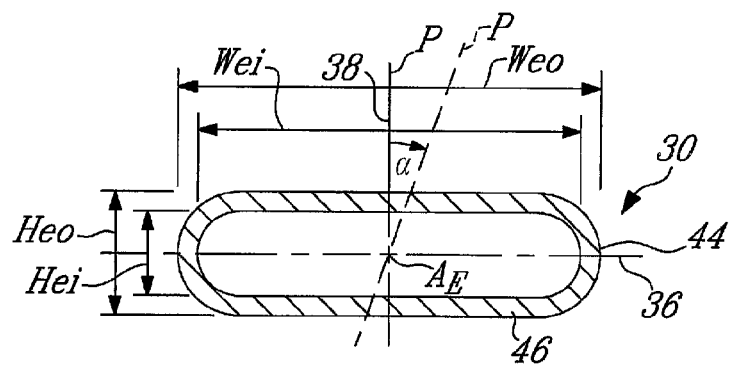
FIG. 3B is a cross-sectional view of the cross tube of the gear of FIG. 2 taken along line B-B thereof.
Figure 3C:
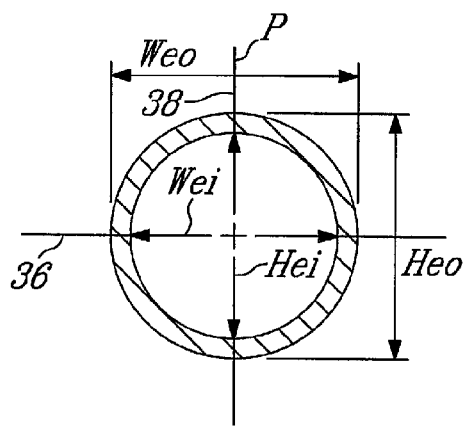
FIG. 3C is a cross-sectional view of an alternate configuration for the cross tube of the gear of FIG. 2.

Referring particularly to FIG. 3A, the cross-section of at least part of the central portion 28 is shown. In a particular embodiment, the same cross-section is defined along a major part of the length of the central portion 28. In the embodiment shown, the central portion 28 includes near the bends 25 a transitional region where the cross-section progressively varies to merge with the cross-section of the end portions 30, and the remainder of the central portion 28 has a constant cross-section between these two transitional regions. In another embodiment, the central portion 28 may include relatively small regions having a different cross-section for attachment with the fittings connecting the cross-tube to the helicopter.

The cross-section of the central portion 28 defines first and second axes 32, 34. The axes 32, 34 and longitudinal central axis $A_C$ are perpendicular to each other and intersect at a common point. One of the axes 32, 34 (in the embodiment shown, the first axis 32) extends along a minimum outer cross-sectional dimension of the portion 28. Although not shown, it is understood that the minimum outer cross-sectional dimension may be defined in two or more directions, such as for example for a square cross-section or a circular cross-section.

In the embodiment shown, the first axis 32 extends perpendicularly to the plane P while the second axis 34 extends within the plane P. In an alternate embodiment, and illustrated by the plane P in phantom, the second axis 34 may extend at an angle θ with respect to the plane P.

In a particular embodiment, the front cross tube 24 is attached to the fuselage 12 such that the plane P is slightly angled with respect to the skids 22, for example by approximately 7°. In such an embodiment, the second axis 34 may be correspondingly angled (e.g. by θ being approximately 7°) with respect to the plane P such as to extend perpendicularly to the skids and extend vertically when the skids are resting on a horizontal surface. Such a configuration may help align the cross-section of the central portion 28 with the direction of the loads transferred during landing.

In an alternate embodiment, the front cross tube 24 can be more or less angled with respect to the skids 22; in a particular embodiment, the front cross tube 24 may be perpendicular to the skids.

In the embodiment shown, the minimum outer cross-sectional dimension corresponds to the outer width $W_{co}$ which is defined between the outer surfaces of the corresponding wall segments 40 of the central portion 28 along the first axis 32. An inner width $W_{ci}$ can also be defined between the inner surfaces of the corresponding wall segments 40 of the central portion 28 along the first axis 32.

Inner and outer heights $H_{ci}$, $H_{co}$ are also defined between the inner surfaces and between the outer surfaces, respectively, of the corresponding wall segments 42 of the central portion 28 along the second axis 34. It is understood that in another embodiment the first and second axes 32, 34 may be oriented differently and/or the minimum outer cross-sectional dimension may be defined along the second axis 34.

In the embodiment shown, the cross-section of the central portion 28 has a rectangular shape, and as such both the first and second axes 32, 34 correspond to axes of symmetry of the cross-section. In another embodiment, only one of the axes 32, 34 is an axis of symmetry of the cross-section. In another embodiment, the cross-section does not have an axis of symmetry (e.g. non-symmetrical airfoil shape).

Referring to FIG. 3B, the cross-section of at least part of each end portion 30 is shown. In a particular embodiment, the same cross-section is defined along a major part of the length of the end portion 30. In the embodiment shown, the end portion 30 includes near the bends 25 a transitional region where the cross-section progressively varies to merge with the cross-section of the central portion 28, and the remainder of the end portion 30 has a constant cross-section. In another embodiment, the cross-section is defined from the end of the end portion 30 which is spaced apart from the central portion 28, for example to be shaped for attachment with a saddle attachment or other type of attachment for connection with the skids, with the remainder of the end portion extending up to the bend 25 having a different cross-section; the proportion between these two different sections may be varied with one or the other defining the major part of the end portion 30.

FIG. 3B shows a cross-section which in a particular embodiment corresponds to the entirety of the end portion 30 with the exception of the transitional region. The cross-section defines third and fourth axes 36, 38. The third and fourth axes 36, 38 and longitudinal central axis $A_E$ are perpendicular to each other and intersect at a common point. One of the axes 36, 38 (in the embodiment shown, the fourth axis 38) extends along a minimum outer cross-sectional dimension of the portion 30.

In the embodiment shown, the third axis 36 extends perpendicularly to the plane P (and parallel to the first axis 32) while the fourth axis 38 extends within the plane P. In an alternate embodiment, and illustrated by the plane P in phantom, the fourth axis 38 may extend at an angle α with respect to the plane P.

In the embodiment shown, the minimum outer cross-sectional dimension corresponds to the outer height, $H_{eo}$ which is defined between the outer surfaces of the corresponding wall segments 46 of the end portion 30 along the fourth axis 38. An inner height $H_{ei}$ can also be defined between the inner surfaces of the corresponding wall segments 46 of the end portion 30 along the fourth axis 38.

Inner and outer widths $W_{ei}$, $W_{eo}$ are also defined between the inner surfaces and between the outer surfaces, respectively, of the corresponding wall segments 44 of the end portion 30 along the third axis 36. It is understood that in another embodiment the third and fourth axes 36, 38 may be oriented differently and/or the minimum outer cross-sectional dimension may be defined along the third axis 36.

In the embodiment shown, the cross-section of the end portion 30 has a rectangular shape, and as such both the third and fourth directions 36, 38 correspond to axes of symmetry of the cross-section. In other embodiments, a single one or none of the axes 36, 38 are an axis of symmetry of the cross-section.

FIG. 3C shows a cross-section which in a particular embodiment corresponds to at least the end of the end portion 30 which is spaced apart from the central portion 28. It is of course considered to use such a cross-section on another part of the end portion 30. The cross-section defines third and fourth axes 36, 38, with the axes 36, 38 and longitudinal central axis $A_E$ being perpendicular to each other and intersecting at a common point. As the cross-section is circular, the minimum outer cross-sectional dimension may be defined along any of the axes 36, 38. The fourth axis 38 is defined as extending within the plane P. The outer height $H_{eo}$ and outer width $W_{eo}$ are the same and correspond to an outer diameter of the cross-section. The inner height $H_{ei}$ and inner width $W_{ei}$ are the same and correspond to an inner diameter of the cross-section.

In a particular embodiment, the cross-sections of FIGS. 3B and 3C are used in combination to define adjacent sections of the end portion 30.

The cross tube has a particular geometry in that when comparing dimensions along corresponding axes one of the central portion and the end portion has greater inner and outer heights than the other and/or one of the central portion and the end portion has greater inner and outer widths than the other. In the context of the present application and for dimensional comparisons, the axis of the central portion having the smallest angle with respect to the plane P is viewed as corresponding to the axis of the end portion having the smallest angle with respect to the plane P, and the remaining axis of the central portion is viewed as corresponding to the remaining axis of the end portion. In the embodiment shown, both θ and α are smaller than 45°; the first axis 32 and the third axis 36 are corresponding axes, and the second axis 34 and the fourth axis 38 are corresponding axes. In another embodiment, corresponding axes may be defined as the two axes extending closest to the horizontal, and the two axes extending closest to the vertical; such a definition may be particularly useful in the particular case where one or both of the angles θ, α is exactly 45°.

By contrast, prior art cross tubes typically have smaller overall outer dimensions in the end portions with respect to the central portion, obtained by chemical milling of the end portions, while maintaining constant inner dimensions between the central and end portions. In a particular embodiment, the larger dimensional difference between the central portion 28 and the end portions 30 may help in optimizing the cross-section with respect to the load distribution.

In the embodiment shown, and comparing FIGS. 3A-C, we can see that the inner and outer dimensions of the central portion 28 defined along the second axis 34 are respectively greater than the inner and outer dimensions of the end portion 30 defined along the fourth axis 38, i.e. the central portion 28 has inner and outer heights respectively greater than the inner and outer heights of the end portions 30 ($H_{ci} > H_{ei}$ and $H_{co} > H_{eo}$). In the embodiment shown, the inner height of the central portion 28 is also larger than the outer height of each end portion 30 ($H_{ci} > H_{eo}$).

We also see that in the embodiment shown, the inner and outer dimensions of the central portion 28 defined along the first axis 32 are respectively smaller than the inner and outer dimensions of the end portion 30 defined along the third axis 36, i.e. the central portion 28 has inner and outer widths respectively smaller than the inner and outer widths of the end portions 30 ($W_{ci} < W_{ei}$ and $W_{co} < W_{eo}$). In the embodiment shown, the outer width of the central portion 28 is also smaller than the inner width of each end portion 30 ($W_{co} < W_{ei}$).

In the embodiment shown in FIG. 3A and as discussed above, the cross-sections are also oriented such that the largest dimension of the central portion 28 is its height ($W_{ci} < W_{co} < H_{ci} < H_{co}$) while the largest dimension of each end portion is its width ($H_{ei} < H_{eo} < W_{ei} < W_{eo}$). In a particular embodiment, such a contrast in geometry may further help in optimizing the cross-section with respect to the load distribution. For example, in a particular embodiment, the ratio between the outer width and height ($W_{co}/H_{co}$) of the central portion 28 is approximately 0.7, and the ratio between the outer width and height ($W_{eo}/H_{eo}$) of each end portion 30 is approximately 4.1.

Landing gear assemblies are designed to absorb a specific amount of energy by elastic or plastic deformation. For example, if a helicopter is dropped from a certain height specified by the design regulations, the landing gear assembly must absorb sufficient energy to prevent damage to the helicopter fuselage. Therefore, the landing gear assembly 20 must have a specific stiffness. However, if the stiffness of the cross tubes 24, 26 is too high, the cross tubes 24, 26 acts as stiff springs and no or insufficient plastic deformation occurs, thus allowing high loads to be transferred to the fuselage 12 which require airframe reinforcing. On the other hand, if the stiffness is too low, the cross tubes 24, 26 undergo large deformations which may cause the belly of the fuselage 12 to impact the ground.

In the embodiment shown, the central portion 28 of the front cross tube 24 is sized to meet these stiffness requirements, with its largest dimension or height $H_{ci}$, $H_{co}$ being defined in a direction corresponding or close to the vertical direction when the helicopter 10 is landing on level ground. The inertia of the central portion 28 may thus be tailored to the particular loads supported by that portion, including the vertical loads produced by hard landings.

In the end portions 30, the bending moment from the vertical loads is reduced compared to that in the central portions 28, but other situations such as landing with drag create loads along the longitudinal axis L of the skids. The end portions 30 are thus sized to meet these loads, for example as per FIG. 3B with a larger width $W_{ei}$, $W_{eo}$ being defined in a direction corresponding or close to the longitudinal axis L of the skids. The inertia of the end portions 30 may thus be tailored to the particular loads supported by these portions, including the longitudinal loads produced by landings with drag.

The cross-sectional shape of the front cross tube 24 may thus be adapted to the particular dominant loads in each portion, while minimizing the overall weight of the cross tube. In a particular embodiment and as an example only, the front cross tube 24 may be 25-30% lighter than a prior circular and chemically milled front cross tube sized for a same helicopter. In a particular embodiment, the cross-sectional shape of each portion of the front cross tube 24 is selected such as to tailor the inertia according to the particular loads applied to that portion.

Although the cross-sections are shown as rectangular, other adequate cross-sectional shapes allowing different dimensions in transverse axes may also be used, such as for example oval or egg-shaped cross-sections. Such cross-sections may allow more material to experience a more uniform plastic strain by comparison to a prior cross tube with a circular cross-section.

In a particular embodiment, the front cross tube 24 is manufactured using a hydroforming process. Such a process allows for the above described variations in cross-section throughout the length of the cross tube.

In prior landing gear with circular chemically milled cross tubes, the desired stiffness is usually obtained by sizing the outer diameter of the cross tube while keeping it below a given value such as to obtain the proper stiffness and sizing the thickness of the cross tube wall while keeping it above a given value to have enough reserve for plastic deformation. Such a cross tube having a relatively small outer diameter combined with a relatively high thickness, made from high strength material, is generally not adapted for hydroforming, since the required forming pressure is generally too high for an efficient and acceptable manufacturing process. Also, the initial material dimensions and thickness of these cross tube are generally selected to optimize the performance of the central portion where plastic deformation occurs, and the end portions are chemically milled to remove extra material, but the removal of material is limited by the longitudinal loads applied to the end portions. As such, minimization of the cross tube weight is limited.

By comparison with a prior cross tube made from a constant diameter tube bent to shape with selected portions of its outer surface chemically milled, the front cross tube 24, when sized for a same helicopter, is formed from initial material tubing having an increased outer diameter and reduced wall thickness, because of the tailored cross-sectional dimensions in each portion 28, 30. In an exemplary embodiment, as sized for a same helicopter of approximately 5500 lbs, the front cross tube 24 is hydroformed from initial material tubing having a diameter of approximately 1.33 times and a wall thickness of approximately 0.39 times that of the initial material tubing used to form a prior circular, bent and chemically milled front cross tube; such values are provided as an example only and it is understood that other ratios are possible. The larger outer diameter and reduced wall thickness of the initial material tubing allows the use of hydroforming technology with a reasonable hydroforming pressure, for example 25 ksi. In addition, the reduced wall thickness helps minimize the weight of the cross tube.

In the embodiment shown, the rear cross tube 26 has a circular cross-section formed by bending a tube having a constant cross-section, and which may be machined, e.g. chemically milled, to reduce its thickness were required, as is typical in the prior art. In an alternate embodiment, the rear cross tube 26 may have a shape similar to that of the front cross tube 24 while being sized for the particular loads to be supported thereby, or a different geometry than that of the front cross tube 24 but with a cross-sectional shape optimized along its length to tailor the inertia according to the loads to be supported, i.e. different cross-sections in the end portions and central portions and optionally intermediary portions therebetween. In such a case, the rear cross tube 26 may be hydroformed as well.

Accordingly, in a particular embodiment, the above-description and exemplary cross-sections shown in FIG. 3A-C may be understood to apply to the rear cross tube 26 as well as to the front cross-tube 24.

Similarly, the skid tubes may have different portions with different cross-sections, and be manufactured through hydroforming; for example, and referring to FIG. 2, each skid tube 22 may have different cross-sections along the portions 22a, 22c defining a region of attachment with the cross-tubes (in a particular embodiment, the two portions 22a, 22c having a same cross-section) and along the portion 22b extending between these regions of attachment. The tip portion 22d of the skid may also have a cross-section differing from those of the regions of attachment 22a, 22c, which in a particular embodiment may be the same as that of the portion 22b located therebetween. The rear of the skid may also have a different cross-section.

Figure 4A:
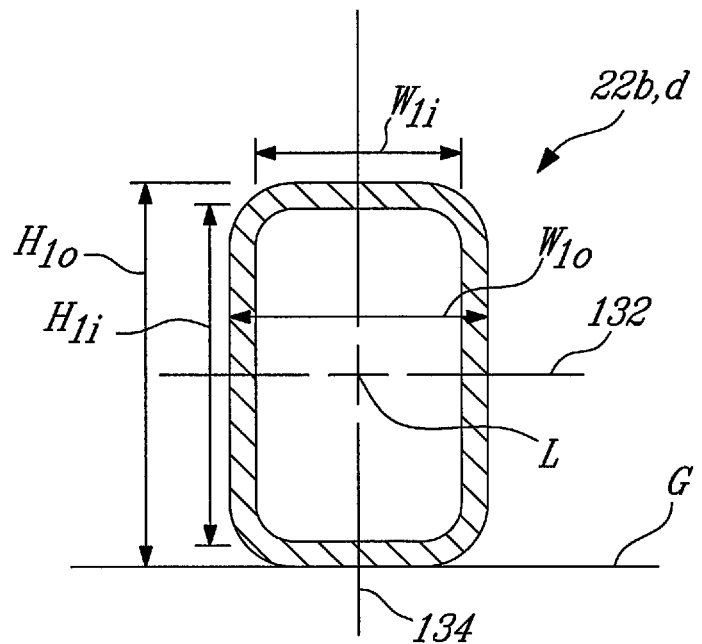
FIG. 4A is a cross-sectional view of a portion of a skid tube of a gear such as shown in FIG. 2, in accordance with a particular embodiment.

Referring to FIG. 4A, a particular embodiment of a cross-section for the first portions 22b, 22d of the skid 22 extending between and from the regions of attachment is shown. The cross-section of these first portions 22b, 22d defines first and second axes 132, 134. The axes 132, 134 and longitudinal skid axis L are perpendicular to each other and intersect at a common point. One of the axes 132, 134 (in the embodiment shown, the first axis 132) extends along a minimum outer cross-sectional dimension of the portion 22b, 22d. Although not shown, it is understood that the minimum outer cross-sectional dimension may be defined in two or more directions, such as for example for a square cross-section or a circular cross-section.

In the embodiment shown, the minimum outer cross-sectional dimension corresponds to the outer width $W_{1o}$ which is defined between the outer surfaces of the corresponding wall segments along the first axis 132. An inner width $W_{1i}$ can also be defined between the inner surfaces of the corresponding wall segments along the first axis 132. Inner and outer heights $H_{1i}$, $H_{1o}$ are also defined between the inner surfaces and between the outer surfaces, respectively, of the corresponding wall segments along the second axis 134. It is understood that in another embodiment the first and second axes 132, 134 may be oriented differently and/or the minimum outer cross-sectional dimension may be defined along the second axis 134.

Figure 4B:
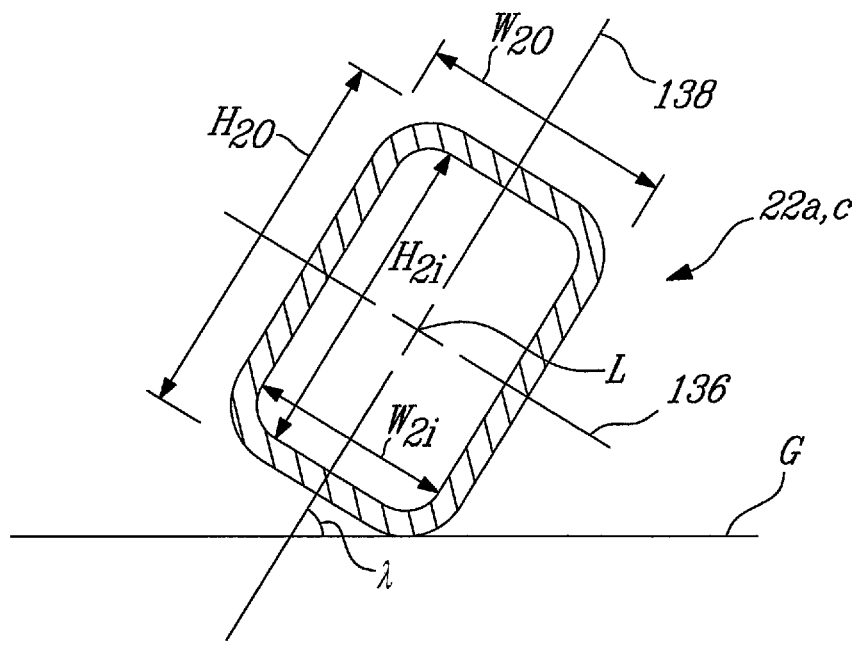
FIG. 4B is a cross-sectional view of another portion of the skid tube.

Referring to FIG. 4B, a particular embodiment of a cross-section for the second portions 22a, 22c of the skid 22 defining the regions of attachment is shown. The cross-section defines third and fourth axes 136, 138. The third and fourth axes 136, 138 and longitudinal skid axis L are perpendicular to each other and intersect at a common point. One of the axes 136, 138 (in the embodiment shown, the third axis 136) extends along a minimum outer cross-sectional dimension of the portion 22a, 22c. Although not shown, it is understood that the minimum outer cross-sectional dimension may be defined in two or more directions, such as for example for a square cross-section or a circular cross-section.

In the embodiment shown, the minimum outer cross-sectional dimension corresponds to the outer width $W_{2o}$ which is defined between the outer surfaces of the corresponding wall segments along the third axis 136. An inner width $W_{2i}$ can also be defined between the inner surfaces of the corresponding wall segments along the third axis 136. Inner and outer heights $H_{2i}$, $H_{2o}$ are also defined between the inner surfaces and between the outer surfaces, respectively, of the corresponding wall segments along the fourth axis 138. It is understood that in another embodiment minimum outer cross-sectional dimension may be defined along the fourth axis 138.

The cross-sections of the first and second portions 22b, 22d and 22a, 22c have different orientations and/or different dimensions with respect to one another. In the embodiment shown, the second axis 134 of the first portions extends perpendicularly to the ground contact plane G defined by contact of the skid 22 with a level ground surface, while the fourth axis 138 of the second portions extends at an angle λ different than 90° with respect to the ground contact plane G. In a particular embodiment, this angle λ corresponds to the angle of the end portion 30 of the cross tube 24, 26 once assembled to the skid 22, i.e. the fourth axis 138 extends in alignment with the longitudinal central axis $A_E$ of the end portion 22 of the cross tube, for example such as to facilitate assembly therewith.

In a particular embodiment, the first and second portions 22b, 22d and 22a, 22c having a different orientation from one another have the same dimensions, i.e. $W_{1i}=W_{2i}$, $W_{1o}=W_{2o}$, $H_{1i}=H_{2i}$ and/or $H_{1o}=H_{2o}$.

In another embodiment, the first and second portions 22b, 22d and 22a, 22c may have different dimensions, with the inner and outer widths of one of the first and second portions 22b, 22d and 22a, 22c respectively greater than the inner and outer widths of the other one of the first and second portions 22b, 22d and 22a, 22c, and/or the inner and outer heights of one of the first and second portions 22b, 22d and 22a, 22c respectively greater than the inner and outer heights of the other one of the first and second portions 22b, 22d and 22a, 22c. In one embodiment, the first and second portions 22b, 22d and 22a, 22c having different dimensions are aligned with one another, i.e. with the first and third axes 132, 136 being parallel. In another embodiment, the first and second portions 22b, 22d and 22a, 22c having different dimensions also have different orientations. Although both shown with a rectangular shape, the cross-sections of the first and second portions 22b, 22d and 22a, 22c may alternately have different shapes, for example with one of the portions having a circular cross-section similarly to that shown in FIG. 3C. Although both shown as having a height larger than its width, the cross-sections of one or both of the first and second portions 22b, 22d and 22a, 22c may alternately have a width larger than its height. The use of hydroforming to manufacture the skids 22 allow for these various configurations to be obtained from a straight tubular member.

Referring to FIGS. 5-8, an exemplary embodiment of a hydroforming apparatus 50 is shown, adapted to manufacture the front cross tube 24 or rear cross tube 26 of the embodiment shown; it is understood that an apparatus 50 having a different configuration may alternately be used, and that the configuration will vary according to the final shape of the tube to be manufactured. For example, a similar apparatus for forming the skid 22 is shaped in accordance with the configuration of skid to be obtained. The apparatus 50 shown advantageously bends and hydroforms the tube. Alternately, the tube may be bent by separate equipment before hydroforming, for example using a draw bending machine.

Referring to FIG. 5, the apparatus 50 includes a top member 52 and a bottom member 54 between which a molding assembly 56 is received. The top and bottom members 52, 54 are interconnected through a plurality of rods 58 extending outside of the molding assembly. Each member 52, 54 includes top and bottom plates 60a,b, 62a,b interconnected by perpendicular walls 64 disposed in a rectangular pattern for reinforcement. Each rod 58 has a top end 66 extending through the top member 52 and fixed to an outer surface of its top plate 60a, and a bottom end 68 extending through the bottom member 54 and connected under its bottom plate 62b to a hydraulic cylinder 70 actuable to bring the top and bottom members 52, 54 toward and away from each other.

Referring to FIG. 6, the molding assembly 56 includes a bottom mold 72 having a concave portion 74 and a convex portion 76 which cooperate to define the desired profile of the cross tube therebetween. In the embodiment shown, the convex portion 76 is fixed and rests against the top plate 62a of the bottom member 54, and the concave portion 74 includes a fixed portion 78 to shape the central portion 28 and two pivoting wings 80 each pivotally attached to a respective end of the fixed portion 78 to shape the end portions 30 and bends 25. The pivoting wings 80 pivot from an open position (shown in FIG. 6) where a straight tube T may be inserted between the concave and convex portions 74, 76, and a closed position (shown in FIG. 8, together with the open position) where an elongated cross tube cavity is defined between the concave and convex portions 74, 76.

Alternately, if the central portion 28 of the cross tube 24 is curved, the concave portion 74 may be completely movable, including for example two pivoting wings attached to the bottom member 54 to pivot around a same axis, or more than two pivoting members.

Figure 9:
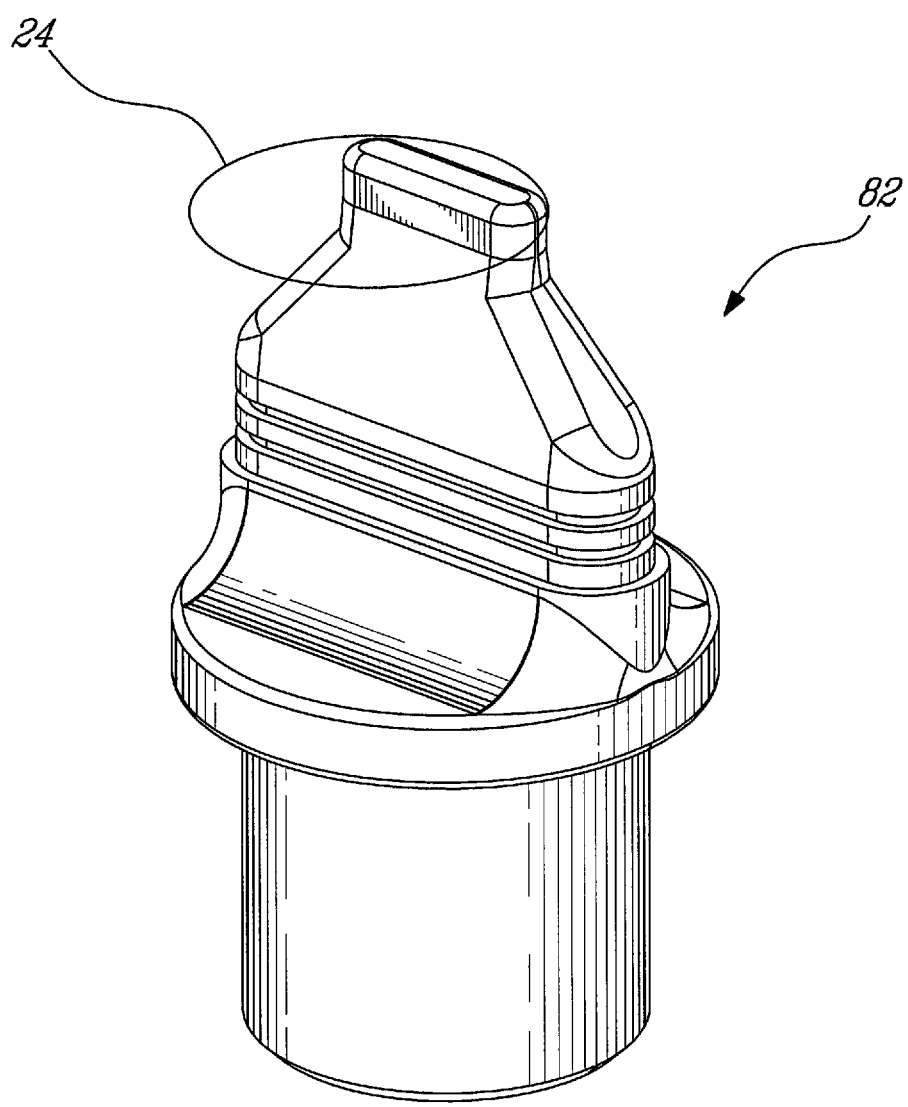
FIG. 9 is a schematic tridimensional view of an end plug of the apparatus of FIG. 5.

The apparatus 50 also includes two movable end plugs 82 sized to plug the ends of the tube, and through which pressure may be applied to the interior of the tube using water or another water-based fluid for hydroforming. An exemplary end plug is shown in FIG. 9.

Referring to FIG. 7, the molding assembly 56 also includes a top mold 84, which defines an elongated cavity complementary to the cross tube cavity formed between the concave and convex portions 74, 76 of the bottom mold 72 in the closed position, such that the engaged top and bottom molds 84, 72 together form a mold cavity having the desired shape for the cross tube 24.

In use, the top and bottom members 52, 54 of the apparatus 50 are moved away from one another, the top mold 84 is disengaged from the bottom mold 72, and the pivoting wings 80 are pivoted in the open position. A straight tube T is inserted between the concave and convex portions 74, 76 of the bottom mold 72. The wings 80 are moved to the closed position, thus bending the tube and forming the bends 25, as shown in FIG. 6. The top mold 84 is engaged to the bottom mold 72, enclosing the bent tube therebetween, as shown in FIG. 7. The top and bottom members 52, 54 are pressed together by the hydraulic cylinders 70 using a pressure sufficient to maintain the bottom and top molds 72, 84 engaged despite the pressure of the hydroforming process. With the end plugs 82 sealingly inserted into the ends of the bent tube, water or another water-based fluid is inserted into the tube, and the tube is pressurized until its walls conform to the cavity defined between the bottom and top molds 72, 84. When the tube has reached the desired shape, the hydroforming pressure is released, the bottom and top molds 72, 84 are disengaged from one another and the cross tube 24 can be removed.

In the embodiment shown, the end portions 30 and the central portion 28 (and of the skid 22 for the case of an hydroformed skid) have a same wall thickness along at least a substantial portion of their perimeter and have a perimeter with a same length, i.e. the initial tubing before forming has a constant diameter and thickness as much as possible, and the hydroforming is performed such as to keep a constant thickness in the central and end portions 28, 30 (and skid 22) and as such a constant perimeter length; the bending process may however produce a variation in thickness in the bends 25. In a particular embodiment, the wall thickness of the unformed initial tubing T is the same or approximately the same as the wall thickness of the walls of the formed end portions 30 and central portion 28 (and skid 22), i.e. the hydroforming does not reduce the wall thickness of the tube; as a non-limiting example, in a particular embodiment such thickness may be about 0.125 inches. It is however understood that the thickness in the corners where the walls intersect may be slightly smaller than that of the walls due to the forming process.

Alternately, the wall thickness and/or the perimeter length may vary between the central and end portions 28, 30 and/or skid 22 or across one of these portions 28, 30 and/or skid 22. For example, end feeding may be used, which includes longitudinally compressing the ends of the tube with the end plugs 82 during or after hydroforming to locally increase the thickness of the tube.

In a particular embodiment, the straight initial material tubing T which is used to manufacture the cross tubes 24, 26 and/or skids 22 is made of an unstable temper condition of the material of the final tubes. For example, the cross tubes 24, 26 and/or skids 22 are formed from initial tubing in one of the 7075-WXXX material conditions, preferably, the 7075-W511 material condition. In other words, the tubes are formed before aging the material. In a particular embodiment, this allows sufficient ductility while avoiding a quench that could distort the part. After forming, the cross tubes 24, 26 and skids 22 are aged to a T73511 and T6511 temper respectively, or more generically, 7075-T73XXX or 7075-T6XXX. Forming the material in the unstable temper condition allows for the pressure required for hydroforming to be lower. This may also help to lower shape distortion.

In a particular embodiment, the parameters of the aging process, like heating rate, temperature and duration, are adjusted to provide adequate and more uniform material properties, despite the fact that some regions of the part have been deformed substantially more during manufacturing than others; in some cases, some regions may have no or practically no deformation while others have substantial deformation. Using numerical analysis with a proper material model, the material history is followed throughout the whole manufacturing process. Then aging parameters can be selected depending of the amount of deformation induced in the part during manufacturing.

A test was performed where two samples of 7075-W were aged to T73 using a different $2^{nd}$ soak time different than the frequently used duration of 6-8 h, and two samples were aged for 7 hours for comparison. The parameters of the heat treatment were:

$1^{st}$ ramp: from room temperature to 107° C. at 0.1° C./s
$1^{st}$ soak: 8 h at 107° C.
$2^{nd}$ ramp: from 107° C. to 177° C. at 0.1° C./S
$2^{nd}$ soak: 177° C., duration as per table below Table I shows that the two samples with the usual $2^{nd}$ soak time of 7 h produce a tensile yield stress for 15% pre-deformed material which is 74% that of the undeformed material, and a ultimate tensile stress for the 15% pre-deformed material which is 81% that of the undeformed material. By reducing the $2^{nd}$ soak time to 5 h, the losses to the undeformed material are minimal (2% loss on the tensile yield stress and 1% loss on the ultimate tensile stress with respect to the 7 h hour $2^{nd}$ soak) while the properties for the 15% pre-deformed material are substantially improved (8% increase on the tensile yield stress and 6% increase on the ultimate tensile stress).

TABLE I

Effect of treatment duration on final properties of AA7075-T73

| Soak time 2 [h] | Tensile yield stress [normalized value] | Ultimate tensile stress [normalized value] |
| --- | --- | --- |
| No pre-deformation | | |
| 7 | 1 | 1 |
| 5 | 0.98 | 0.99 |
| 15% pre-deformation | | |
| 7 | 0.74 | 0.81 |
| 5 | 0.82 | 0.87 |

Another test was performed where 7075-W was aged to T73 using a lower first heating rate to compare with the first heating rate of 0.1° C./s set forth above. Table II shows that by reducing the first heating rate from 0.1° C./s to 0.008° C./s, the properties of the undeformed material remain the same while the properties for the 15% pre-deformed material are substantially improved (8% increase on the tensile yield stress and 6% increase on the ultimate tensile stress).

TABLE II

Effect of first heating rate (Ramp1) on final properties of AA7075-T73

| Ramp 1 [° C./s] | Tensile yield stress [normalized value] | Ultimate tensile stress [normalized value] |
|---|---|---|
| No pre-deformation | | |
| 0.1 | 1 | 1 |
| 0.008 | 1 | 1 |
| 15% pre-deformation | | |
| 0.1 | 0.74 | 0.81 |
| 0.008 | 0.82 | 0.87 |

As such, a lower heating rate and/or shorter $2^{nd}$ soak time can help to get better and more uniform material properties in the different regions of the front cross tube 24 despite their level of deformation being significantly different. Based on these results, other changes such as decreasing the $1^{st}$ or $2^{nd}$ soak temperatures, or $1^{st}$ soak time, may similarly help to get better and/or more uniform properties. The material history is carried out up to numerical drop test simulation where an optimization process can be carried out with actual material properties.

The 7075 aluminum is not typically used in hydroforming, and even in its unstable temper, the 7075-W511 aluminum has a relatively low ultimate strain compared to a typical hydroformed materials. Accordingly, in an alternate embodiment, and in particular in cases where larger deformations are required to achieve the desired shape, the cross tube 24, 26 and/or skid 22 may be formed in multiple forming steps between which the tube is heat treated to restore its formability. For example, the initial material tubing may be bent from a straight tube in the 7075-W511 condition, and then annealed and re-heat treated to the 7075-W condition. The tube is then hydroformed to obtain the desired cross tube cross-sections and dimensions and finally aged to 7075-T73 condition.

Once formed, the cross tubes 24, 26 and/or skid 22 may be treated to increase their fatigue life and reliability using any appropriate method. For example, a layer of residual compressive stress may be created by shot peening the outer surface and inner surface of the tubes. Also, a region of material around holes drilled in the cross tubes (e.g. for receiving fasteners for assembly with the skids and/or with the fuselage) may be cold worked to help prevent crack initiation at holes. Further, the cross tubes and skid tubes may be anodized to improve the corrosion resistance, for example through a thin film sulfuric acid anodizing.

In a particular embodiment, use of the present landing gear assembly 20 instead of a prior landing gear with chemically milled circular tubes may allow for a reduced weight and manufacturing time, while maintaining the same or equivalent strength, required energy absorption characteristics and fatigue life. Since the various portions of the front cross tube 24 and/or rear cross tube 26 and/or skids 22 may have a cross-section tailored to the particular dominant loads in that section, in a particular embodiment the present design may provide for an increased design space for sizing of the cross tube.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A helicopter skid landing gear comprising:
two longitudinal skid tubes for contact with the ground;
a front cross tubes interconnecting the two skid tubes; and
a rear cross tube interconnecting the two skid tubes, at least one of the cross tubes including:
 a monolithic metallic tube having a central portion extending transversely between two end portions with longitudinal central axes of the central portion and of the end portions being located in a same plane, with
 at least part of the central portion having a cross-section defining first and second axes with the first axis, the second axis and the longitudinal axis of the central portion extending perpendicularly to each other and intersecting at a common point, one of the first and second axes extending along a minimum outer cross-sectional dimension of the central portion, the first axis extending at a first angle with respect to the plane, the second axis extending at a second angle with respect to the plane, the second angle smaller than the first angle; and
 at least part of each end portion having a cross-section defining third and fourth axes with the third axis, the fourth axis and the longitudinal axis of the end portion extending perpendicularly to each other and intersecting at a common point, one of the third and fourth axes extending along a minimum outer cross-sectional dimension of the end portion, the third axis extending at a third angle with respect to the plane, the fourth axis extending at a fourth angle with respect to the plane, the fourth angle smaller than the third angle;
wherein the cross-section of the central portion has inner and outer heights defined along the second axis and the cross-section of the end portions each have inner and outer heights defined along the fourth axis, and the inner and outer heights of one of the central portion and the end portion are respectively greater than the inner and outer heights of the other of the central portion and the end portion
wherein the second angle is different from the fourth angle.

2. The landing gear as defined in claim 1, wherein the cross-section of the central portion is defined along a major part of a length of the central portion, and wherein the cross-section of the end portions is defined along a major part of a length of each of the end portions.

3. The landing gear as defined in claim 2, wherein the cross-sections of the central portion and of the end portions each have a rectangular shape.

4. The landing gear as defined in claim 2, wherein the cross-section of the central portion has a rectangular shape, and an end of each end portion extending spaced apart from the central portion has a circular cross-sectional shape.

5. The landing gear as defined in claim 1, wherein the inner and outer heights of the central portion are respectively greater than the inner and outer heights of each of the end portions.

6. The landing gear as defined in claim 1, wherein the central portion has inner and outer widths defined along the first axis and the end portions each have inner and outer widths defined along the third axis, and the inner and outer widths of one of the central portion and the end portion are respectively greater than the inner and outer widths of the other of the central portion and the end portion.

7. The landing gear as defined in claim 6, wherein the inner and outer widths of each of the end portions are respectively greater than the inner and outer widths of the central portion.

8. The landing gear as defined in claim 7, wherein the inner and outer heights of the central portion are respectively greater than the inner and outer heights of each of the end portions.

9. The landing gear as defined in claim 1, wherein the fourth axis extends within the plane, such that the fourth angle is 0.

10. The landing gear as defined in claim 1, wherein one or more of the first, second, third and fourth axes is an axis of symmetry.

11. The landing gear as defined in claim 1, wherein the central portion has inner and outer widths defined along the first axis, and the inner and outer heights of the central portion are respectively greater than the inner and outer widths of the central portion.

12. The landing gear as defined in claim 11, wherein the end portions each have inner and outer widths defined along the third axis, and the inner and outer widths of each of the end portions are respectively greater than the inner and outer heights thereof.

13. The landing gear as defined in claim 1, wherein the cross-sections of the central portion and of the end portions each define a perimeter having a same length.

14. The landing gear as defined in claim 1, wherein at least a substantial portion of a perimeter of the cross-section of the central portion has a same wall thickness than at least a substantial portion of a perimeter of the cross-section of each of the end portions.

15. A helicopter skid landing gear comprising:
two longitudinal skid tubes for contact with the ground;
front and rear cross tubes interconnecting the two skid tubes;
wherein each skid tube includes a monolithic metallic tube having at least a first portion and a second portion extending from the first portion, the tube defining a ground contact plane for contact with a ground surface, with
the first portion having a cross-section defining first and second axes with the first axis, the second axis and a longitudinal axis of the first portion extending perpendicularly to each other and intersecting at a common point, one of the first and second axes extending along a minimum outer cross-sectional dimension of the cross-section of the first portion, the first axis extending at a first angle with respect to the ground contact plane, the second axis extending at a second angle with respect to the ground contact plane, the first angle smaller than the second angle; and
the second portion having a cross-section defining third and fourth axes with the third axis, the fourth axis and a longitudinal axis of the second portion extending perpendicularly to each other and intersecting at a common point, one of the third and fourth axes extending along a minimum outer cross-sectional dimension of the cross-section of the second portion, the third axis extending at a third angle with respect to the ground contact plane, the fourth axis extending at a fourth angle with respect to the ground contact plane, the third angle smaller than the fourth angle;
the cross-sections of the first and second portions having one or both of different orientations with respect to one another and different dimensions with respect to one another, the different orientations including the first and third axes being non parallel, the different dimensions including outer and inner cross-sectional dimensions of the first portion defined along the second axis being respectively greater or respectively smaller than outer and inner cross-sectional dimensions of the second portion defined along the fourth axis.

16. The landing gear as defined in claim 15, wherein the second portion defines a region of attachment with a cross-tube, the third angle being different than 0, the fourth axis extending in alignment with a longitudinal axis of an end of the cross-tube when attached to the skid tube.

17. The landing gear as defined in claim 15, wherein the second portion defines a region of attachment with a cross-tube, the cross-section of the second portion having a circular shape, and the cross-section of the first portion having a rectangular shape.

18. The landing gear as defined in claim 15, wherein the cross-sections of the first and second portions both have a rectangular shape.

19. The landing gear as defined in claim 15, wherein the first and third axes are parallel to the ground contact plane, the outer and inner cross-sectional dimensions of the first portion defined along the second axis are respectively greater than the outer and inner cross-sectional dimensions of the second portion defined along the fourth axis, and outer and inner cross-sectional dimensions of the first portion defined along the first axis are respectively equal to outer and inner cross-sectional dimensions of the second portion defined along the third axis.

* * * * *